United States Patent [19]

Linder

[11] Patent Number: 4,934,833
[45] Date of Patent: Jun. 19, 1990

[54] COMBINATION LADDER BAG AND DROP CLOTH

[76] Inventor: Ricky T. Linder, 22 Georgia Ave., St. Cloud, Fla. 32769

[21] Appl. No.: 350,764

[22] Filed: May 12, 1989

[51] Int. Cl.$^5$ .............................................. B65D 30/00
[52] U.S. Cl. ..................................... 383/4; 150/154; 224/328; 383/127; 383/902
[58] Field of Search ......................... 383/4, 902, 127; 224/318, 328, 42.01, 324; 150/154

[56] References Cited

U.S. PATENT DOCUMENTS

| | | | |
|---|---|---|---|
| 2,442,105 | 5/1948 | Vacheron | 383/4 |
| 2,667,353 | 1/1954 | Lanice | 383/4 |
| 2,922,553 | 1/1960 | Wilson | 383/4 |
| 3,073,367 | 1/1963 | Samara | 383/4 |
| 3,489,194 | 1/1970 | Hoover | 383/4 |
| 4,296,788 | 10/1981 | Slater | 383/4 |
| 4,301,920 | 11/1981 | Boggs | 383/4 |
| 4,500,729 | 2/1985 | Hahn | 383/4 |
| 4,723,300 | 2/1988 | Aranow | 383/4 |

FOREIGN PATENT DOCUMENTS 0233097  8/1987  European Pat. Off. ................. 383/4

Primary Examiner—Stephen Marcus
Attorney, Agent, or Firm—H. Jay Spiegel

[57] ABSTRACT

The present invention relates to a combination ladder bag and drop cloth. In its open position, the device comprises a drop cloth designed to be used to cover objects and surfaces which must be protected during painting. The device has a periphery including fastening means allowing it to be folded over a ladder with the fastening means engaged to completely enclose the ladder. In this position, pairs of slots are aligned together which allow the device to be mounted on the roof of a vehicle with brackets thereof extending through the aligned slots to allow fastening of the ladder as contained within the device on top of the vehicle.

4 Claims, 1 Drawing Sheet

COMBINATION LADDER BAG AND DROP CLOTH

BACKGROUND OF THE INVENTION

The present invention relates to a combination ladder bag and drop cloth. In the prior art, bags designed to contain a ladder are known as disclosed in U.S. Pat. No. D 260,576. Furthermore, bags of general utility including an opening which may be selectively closed are known in the prior art as taught by U.S. Pat. No. 4,593,408 to Drobish et al. Finally, storage devices designed to be mounted on the top of vehicle are known in the prior art as taught by U.S. Pat. No. 4,681,361 to Jolley et al.

However, Applicant is unaware of any prior art teaching a device which may be used in one configuration as a storage bag for a ladder and in another configuration as a drop cloth.

SUMMARY OF THE INVENTION

The present invention relates to a combination ladder bag and drop cloth. The present invention includes the following interrelated aspects and features:

(a) In a first aspect, the inventive combination device may, if desired, be made of a generally elongated rectangular configuration having a central fold.

(b) The device may be folded about the fold to align fastening means formed on the periphery thereof so that the fastening means may be engaged to convert the device into a container for a ladder.

(c) In the open position as described in section (a) above, the device may be used as a drop cloth and, for this purpose, is made of a waterproof material such as treated canvas, plastic or other material which may be used to protect an object or surface.

(d) When not being used as drop cloth, the device may be used to store a ladder which may be placed on one side of the device, whereupon the other side may be folded thereover to engage the fastening means to thereby cause the device to be converted into a closed bag.

(e) If desired, a plurality of slots may be formed through the surface of the device, which slots are so located that when the device is folded over to form a bag, pairs of slots are aligned, whereupon the device, with a ladder contained therein, may be placed on the roof of a vehicle with brackets mounted thereon extending through pairs of aligned slots to allow secure fastening of the bag on the roof of the vehicle. When the device is being used as a drop cloth, the slots are closed by covers to prevent leakage of paint therethrough.

Accordingly, it is a first object of the present invention to provide a combination ladder bag and drop cloth. It is a further object of the present invention to provide such a device including fastening means about the periphery thereof allowing the device to be selectively fastened into a bag configuration.

It is yet a further object of the present invention to provide such a device having a plurality of slots which may be aligned in slot pairs when the device is folded over to form a bag so that brackets may be extended through slot pairs to facilitate fastening of the bag on the roof of a vehicle.

These and other objects, aspects and features of the present invention may be better understood from the following detailed description of the preferred embodiments when read in conjunction with the appended drawing figures.

SPECIFIC DESCRIPTION OF THE PREFERRED EMBODIMENTS

Figure 1:
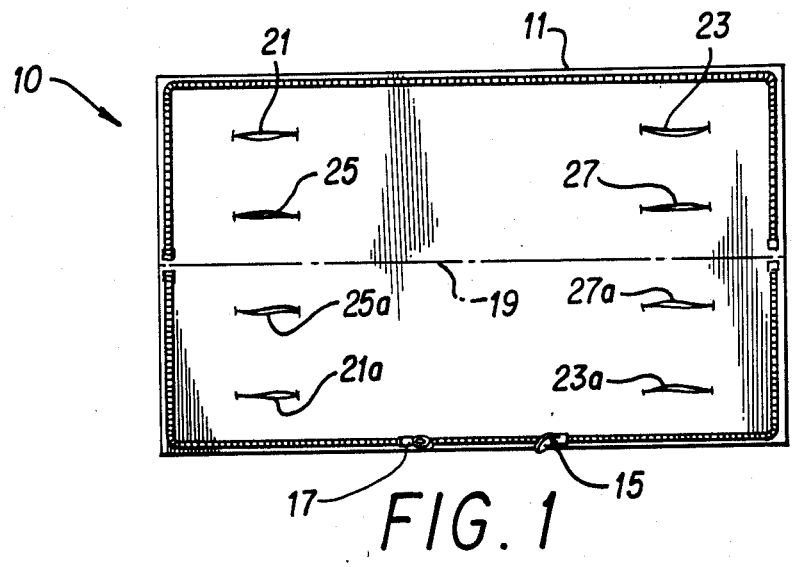
FIG. 1 shows a top view of the inventive device in an open position thereof.

With reference, first, to FIG. 1, the inventive device is generally designated by the reference numeral 10 and is seen to include a generally rectangular periphery 11 having fastening means 13 extending therearound. In the embodiment shown in FIG. 1, the fastening means 13 comprises an elongated peripheral zipper having zipper clasps 15 and 17 included thereon. Of course, other types of fastening means may be employed such as, for example, snaps, hook and pile fastening means or buttons.

Figure 2:
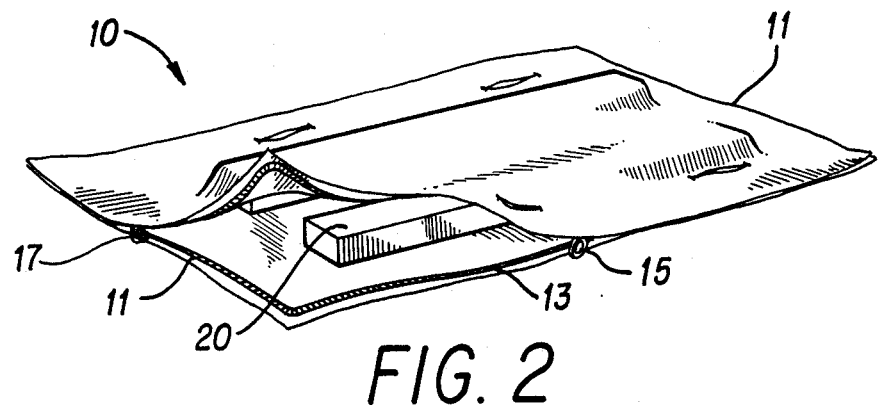
FIG. 2 shows a perspective view of the device as folded over to store a ladder therein.

As further seen in FIG. 1, a crease 19 is formed to best facilitate the folding of the device 10 into the configuration seen in FIG. 2. Also seen in FIG. 2 is a portion of the ladder 20 which may be contained within the device 10 as formed into a bag.

With reference back to FIG. 1, it is seen that slots 21, 23, 25 and 27 are formed through one-half of the device 10 with corresponding slots 21a, 23a, 25a and 27a being formed on the other half of the device 10. As should be understood, when the device 10 is folded about the crease 19, the slots 21 and 21a will be aligned with one another as will the respective slots 23, 23a; 25, 25a; and 27, 27a.

Figure 3:
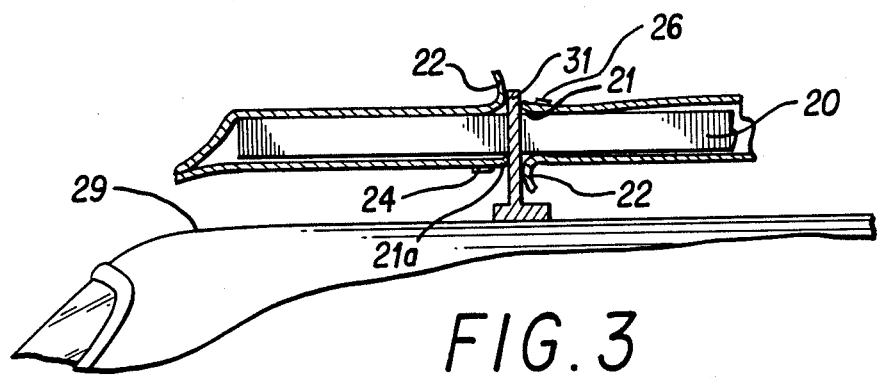
FIG. 3 shows a cross-sectional view through a portion of the structure as shown in FIG. 2, including a fastener extending through a slot pair.

With further reference to FIG. 3, it is seen that each slot has a cover 22 which may be fastened over a respective slot through fasteners such as the hook and pile fastening means 24, 26 shown.

Further, in this regard, with particular reference to FIG. 3, the roof 29 of a vehicle is seen to have mounted thereon a bracket 31 which may extend through the aligned slots 21, 21a. Corresponding brackets may be provided to also extend through the other aligned slots as described above to thereby facilitate the fastening of the device 10 on the roof 29 of the vehicle.

Accordingly, an invention has been described in terms of the preferred embodiment thereof, which fulfills each and every one of the objects of the invention as set forth hereinabove and provides a new and versatile device which may be used not only to store a ladder but also to provide a drop cloth usable to protect objects and/or surfaces adjacent to where painting operations are taking place. The device may be made in any desired size to accommodate ladders of differing sizes and, of course, the brackets are sized to conform with the particular configuration and size of the device.

Of course, various changes, modifications and alterations in the teachings of the present invention may be contemplated by those skilled in the art without departing from the intended spirit and scope thereof. As such, it is intended that the present invention only be limited by the terms of the appended claims

I claim:

1. A combination device comprising:

(a) a flexible piece of substantially fluid impervious material having a crease about which said piece of material is substantially symmetrical, whereby said piece of material may be folded at said crease to align the peripheries of halves thereof together;

(b) said peripheries having releasable fastening means thereon adapted to interact when said piece of material is folded at said crease to form a flexible bag;

(c) whereby when said device is unfolded, it may comprise a drop cloth and when said device is folded at said crease and said peripheries are fastened together, said device may comprise a said flexible bag;

(d) each half of said material having at least one slit therein, said slits being alignable when said material is folded at said crease, and adapted to receive bracket means insertable through said aligned slits to releasably retain said material, forming a flexible bag, in a desired location.

2. The invention of claim 1 wherein each said half has a plurality of said slits therein.

3. The invention of claim 2, wherein each said slit has a cover which may be releasably fastened thereover.

4. The invention of claim 1, wherein when said device comprises a flexible bag, said flexible bag is sized and configured to store a ladder therein.

* * * * *